US006169243B1

(12) United States Patent
Ito

(10) Patent No.: US 6,169,243 B1
(45) Date of Patent: Jan. 2, 2001

(54) AUTOMATIC PERFORMANCE APPARATUS WITH QUICK START BY ACCELERATED LOADING OF SETTING DATA

(75) Inventor: Shinichi Ito, Hamamatsu (JP)

(73) Assignee: Yamaha Corporation, Hamamatsu (JP)

( * ) Notice: Under 35 U.S.C. 154(b), the term of this patent shall be extended for 0 days.

(21) Appl. No.: 09/510,841

(22) Filed: Feb. 23, 2000

(30) Foreign Application Priority Data

Feb. 24, 1999 (JP) ..................................... 11-046398

(51) Int. Cl.[7] ..................................... G01H 7/00
(52) U.S. Cl. ..................................... 84/609; 84/610; 84/612; 84/634; 84/636
(58) Field of Search ..................... 84/600–602, 604–606, 84/609–612, 634–636, 649–652, 666–668

(56) References Cited

U.S. PATENT DOCUMENTS 5,571,981 * 11/1996 Miyamoto .............................. 84/609
5,654,517 * 8/1997 Miyamoto .............................. 84/609
5,703,310 * 12/1997 Kurakake et al. ..................... 84/609

FOREIGN PATENT DOCUMENTS 3-239293 * 2/1990 (JP) .
8-248959 * 3/1995 (JP) .

* cited by examiner

*Primary Examiner*—Robert E. Nappi
*Assistant Examiner*—Marlon Fletcher
(74) *Attorney, Agent, or Firm*—Morrison & Foerster

(57) ABSTRACT

An automatic performance apparatus is constituted by a memory section, a performance section, and a control section. The memory section stores music sequence data used for carrying out an automatic performance of a music piece, and condition setting data used for setting a condition of the automatic performance. The performance section reads out the condition setting data from the memory section to set the condition of the automatic performance, and reads out the music sequence data from the memory section to carry out the automatic performance under the set condition. The control section controls a first rate of reading of the condition setting data faster than a second rate of reading of the music sequence data, thereby accelerating the setting of the condition prior to the automatic performance.

6 Claims, 4 Drawing Sheets

AUTOMATIC PERFORMANCE APPARATUS WITH QUICK START BY ACCELERATED LOADING OF SETTING DATA

BACKGROUND OF THE INVENTION

1. Field of the Invention

The present invention relates generally to an automatic performance apparatus for automatically playing a music piece and, more particularly, an automatic performance apparatus adapted to make a tempo of reading of condition setting data used for setting a condition of the automatic performance, faster than another tempo of reading of music sequence data, which is comparable to a musical tempo of the automatic performance, thereby accelerating the start of a note sequence of the automatic performance.

2. Description of Related Art

Automatic performance apparatuses are known, in which condition setting data used for setting the conditions of the automatic performance (for example, timbres) and music sequence data used for automatically performing a music piece are stored in a memory. The condition setting data are read from the memory at a predetermined tempo or rate in response to an automatic performance start command. The performance conditions are set on the basis of the condition setting data. Then, the music sequence data are read from the memory for carrying out the automatic performance of a desired music piece.

According to these known automatic performance apparatuses, the performance conditions are set by reading the condition setting data at a fixed tempo set for the automatic performance (for example, 120 quarter-notes per minute) and then the music sequence data are read at this tempo for effecting the automatic performance. Consequently, it takes too long for setting the performance conditions before starting of a note-on sequence of the music piece, so that a long silent period due to the condition setting is created before the automatic performance. Such a long silent period makes users feel like a lost time in the automatic performance. The silent period increases as a volume of the condition setting data increases.

SUMMARY OF THE INVENTION

It is therefore an object of the present invention to provide an automatic performance apparatus that is significantly quick in starting a note-on sequence of automatic performance of a music piece.

The inventive automatic performance apparatus comprises a memory section that stores music sequence data used for carrying out an automatic performance of a music piece, and condition setting data used for setting a condition of the automatic performance, a performance section that reads out the condition setting data from the memory section to set the condition of the automatic performance, and that reads out the music sequence data from the memory section to carry out the automatic performance under the set condition, and a control section that controls a first rate of reading of the condition setting data faster than a second rate of reading of the music sequence data, thereby accelerating the setting of the condition prior to the automatic performance.

According to the automatic performance apparatus associated with the invention, the tempo of reading the condition setting data is faster than the tempo of reading the music sequence data. Consequently, the time necessary for setting the automatic performance conditions is shortened, thereby accelerating the start of a note-on sequence of the automatic performance.

The automatic performance apparatus according to the invention may have a command section for commanding the acceleration of the tempo of reading the condition setting data. According to the command given through this command section, the tempo of reading the condition setting data may be made faster than the tempo of reading the music sequence data. This novel constitution makes short or long a preparatory duration before the start of the note-on sequence depending on whether or not the command is given through the command section.

Alternatively, the automatic performance apparatus according to the invention may have a detecting section for detecting the volume of the condition setting data. The value of the condition setting data reading tempo may be determined on the basis of the data volume detected by this detecting section. This novel constitution makes the condition setting data reading tempo faster as the volume of the condition setting data increase, thereby shortening the preparatory time before the start of the note-on of a music piece having a great volume of the condition setting data.

BRIEF DESCRIPTION OF THE DRAWINGS

These and other objects of the invention will be seen by reference to the description, taken in connection with the accompanying drawings, in which.

DETAILED DESCRIPTION OF PREFERRED EMBODIMENTS

Figure 1:
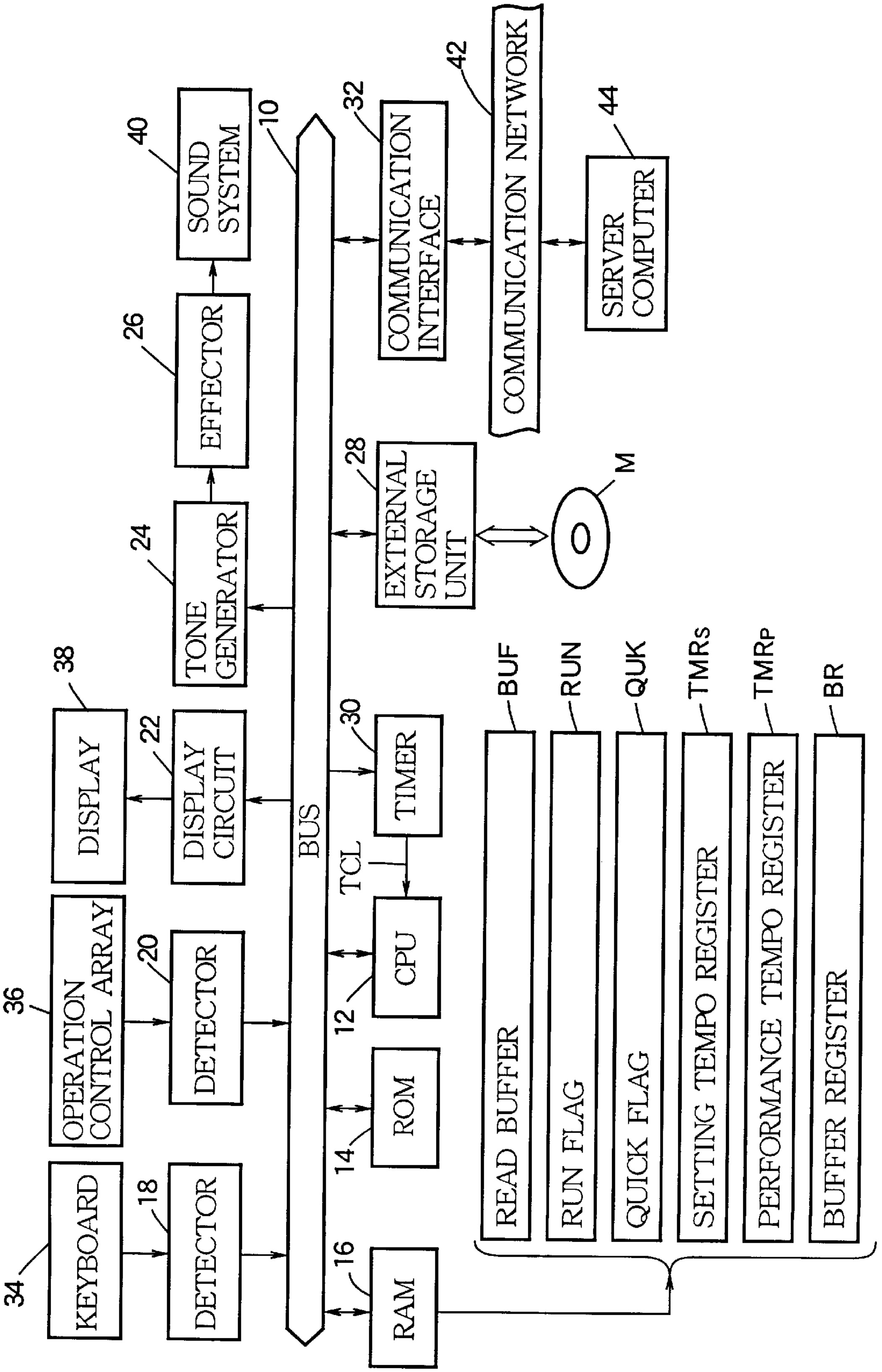
FIG. 1 is a block diagram illustrating a circuit configuration of an electronic musical apparatus having an automatic performance function practiced as one preferred embodiment of the invention.

This invention will be described in further detail by way of example with reference to the accompanying drawings. Now, referring to FIG. 1, there is shown a circuit configuration of an electronic musical apparatus having an automatic performance function practiced as one embodiment of the invention. In this electronic musical apparatus, generation of a manually performed tone and an automatically performed tone is controlled by a small-scale computer such as a personal computer.

A bus 10 is connected to a CPU (Central Processing Unit) 12, a ROM (Read Only Memory) 14, a RAM (Random Access Memory) 16, detectors 18 and 20, a display circuit 22, a tone generator 24, an effector 26, an external storage unit 28, a timer 30, and a communication interface 32.

The CPU 12 executes various processing operations associated with the generation of manually performed tones and automatically performed tones as instructed by a program stored in the ROM 14. These processing operations will be described later with reference to FIGS. 3 and 4.

Figure 2:
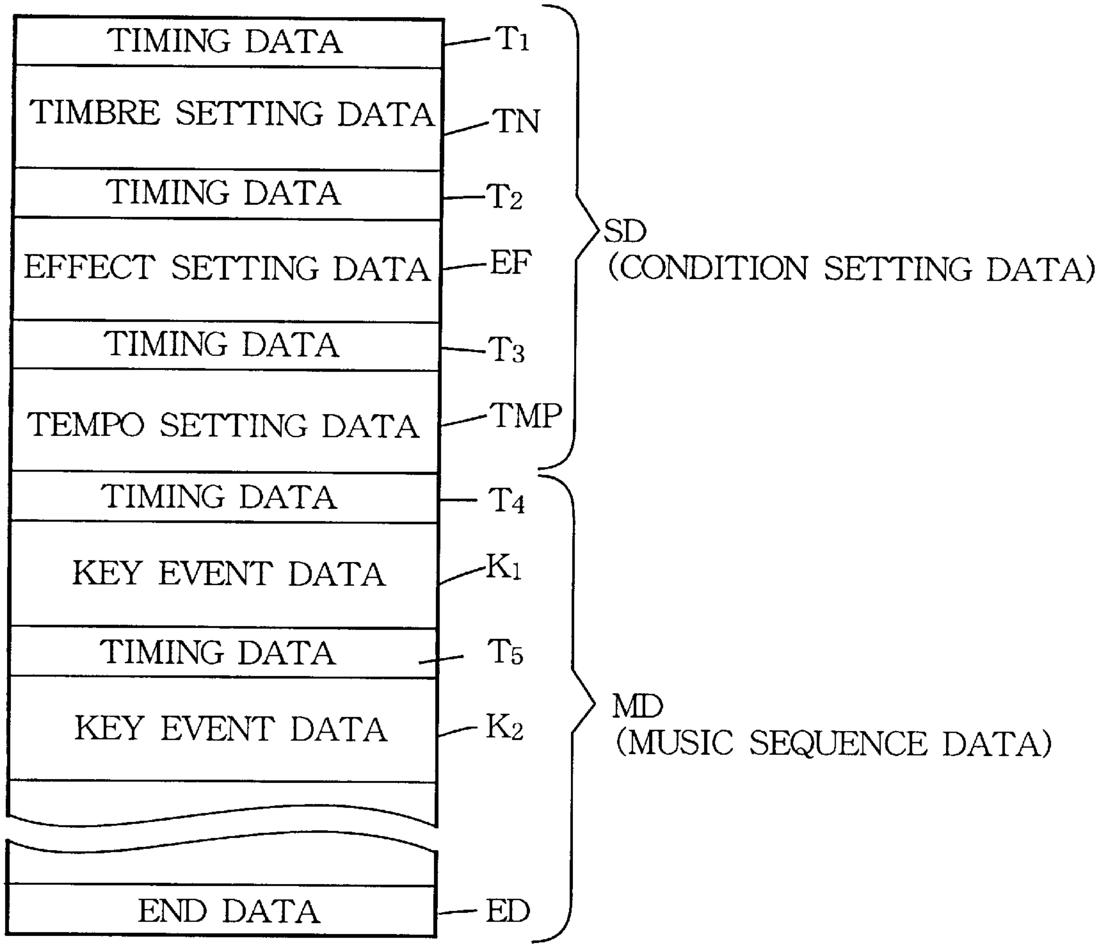
FIG. 2 illustrates a format of automatic performance data.

The ROM 14 stores, in addition to the above-mentioned program, automatic performance data of a plurality of music pieces in a format shown in FIG. 2. The automatic performance data for one music piece shown in FIG. 2 include condition setting data SD and music sequence data MD.

The condition setting data SD are used for setting automatic performance conditions. For example, the data SD include timbre condition setting data TN, effect condition setting data EF, tempo condition setting data TMP, and timing data T1, T2, and T3 associated with these data, respectively. Normally, the condition setting data SD are stored in a block of one to several measures or bars from the beginning of a music score of the automatic performance data. The timing data T1, T2, and T3 each represent a setting time in terms of a count value obtained by a tempo clock signal TCL to be described later. The timbre condition setting data TN indicates a timbre to be set, the effect condition setting data EF indicates an effect to be set, and the tempo condition setting data TMP indicates a tempo value to be set for the automatic performance.

The music sequence data MD are used for automatically performing a selected music piece, and include key event data K1, K2 and so on and timing data T4, T5 and so on associated with these key event data, respectively. Plural pairs of data, each consisting of timing data and key event data, are stored in the order of the progression of one music piece. The timing data T4, T5 and so on each represent a note-on or note-off timing in terms of a count value of the tempo clock signal TCL. Each key event data includes event type data indicative of an event type (key-on or key-off) and pitch data indicative of a pitch of the note to be sounded or silenced. The key-on event data may include, as required, velocity data for determining a tone volume at the time of note-on.

The music sequence data MD may include data for commanding change of a tempo or an effect for example during the progression of the music piece. For example, the data MD include timing data for commanding changing of the tempo. At the end of the music sequence data MD, end data ED is stored for commanding the end of the automatic performance of the music piece. The automatic performance data for other music pieces are also stored in the ROM 14 in the same format as described above with reference to FIG. 2. For automatic performance, the user selects desired automatic performance data of a desired music piece to be performed, and the automatic performance is carried out on the basis of the selected data.

The RAM 16 includes various memory blocks for use in the various processing operations to be executed by the CPU 12. Main memory blocks are a read buffer BUF, a run flag RUN, a quick flag QUK, a setting tempo register TMRS, performance tempo register TMRP, and a buffer register BR.

The read buffer BUF stores the automatic performance data read out from the ROM 14 as selected by the user. The run flag RUN is set to "1" to indicate that automatic performance is running, or otherwise set to "0" to indicate that no automatic performance is running. The quick flag QUK is set to "1" to indicate that the quick start is on, or otherwise set to "0" to indicate that the quick start is not on. The quick start herein denotes that the condition setting data SD is read out at a tempo faster than a music sequence data MD reading tempo.

The registers TMRs and TMRP are each set with a tempo value measured in terms of a number of quarter-notes per minute. The operation for setting tempo values to these registers will be described later with reference to FIGS. 3 and 4.

The buffer register BR temporarily stores the timbre condition setting data TN, the effect condition setting data EF, the tempo condition setting data TMP, and key event data K1, K2, and so on read from the read buffer BUF.

The detector 18 detects information about key operations made on a keyboard 34. The detector 20 detects information about operations of various controls of an operation control array 36. The control array 36 includes tempo setting controls (tempo up and down switches), a music selection control, and a start/stop switch for example. These operation controls are disposed at such locations on a panel of the electronic musical apparatus as convenient for the user to operate. The display circuit 22 controls the operation of a monitor display 38.

The tone generator 24 has plural tone generating channels. For a tone generating scheme, the tone generator 24 can employ wave-table memory, FM, physical modeling, harmonics synthesis, formant synthesis or analog synthesizer based on VCO (Voltage Control Oscillator), VCF (Voltage Control Filter) or VCA (Voltage Control Amplifier). The tone generator 24 may be implemented by a dedicated hardware device, a combination of DSP (Digital Signal Processor) and microprogram, or another combination of CPU and software. The plural tone generating channels may be constituted by plural corresponding circuits or by one circuit that is used in a time sharing manner.

The effector 26 imparts an effect such as chorus and reverberation to a tone signal generated by the tone generator 24. The tone signal outputted from the effector 26 is supplied to a sound system 40 and converted into an acoustic sound.

The external storage unit 28 is detachably mounted with one or more storage medium M such as HD (Hard Disc), FD (Floppy Disc), CD (Compact Disc), DVD (Digital Versatile Disc), and MO (Magneto Optical disc). When a selected storage medium M is mounted on the external storage unit 28, data can be transferred from the storage medium M to the RAM 16. If the mounted storage medium M is writable as with HD and FD, the data in the RAM 16 can be stored back on the medium M.

The timer 30 generates 96 clock pulses as the tempo clock signal TCL within a time equivalent to a quarter-note. Every time the clock pulse is generated, the CPU 12 starts interrupt processing shown in FIG. 4. The time length equivalent to a quarter-note depends on the tempo value held in the register TMRP.

The communication interface 32 is provided to exchange information with a server computer 44 through a communication network 42 such as LAN (Local Area Network), the Internet, or telephone line. The programs and data necessary for practicing this invention may be downloaded from the server computer 44 to the RAM 16 or the external storage unit 28 through the communication network 42 and the communication interface 32.

For the storage device of the automatic performance data, the RAM 16 or the external storage unit 28 may be used instead of the ROM 14. For the program storage device, the storage medium M (HD, FD, CD, DVD, and MO) on the external storage unit 28 may be used instead of the ROM 14. If these storage media are used, the programs stored therein are transferred from the external storage unit 28 to the RAM 16. The CPU 12 operates as instructed by the programs loaded in the RAM 16. This arrangement facilitates installation and upgrading of the programs.

Figure 3:
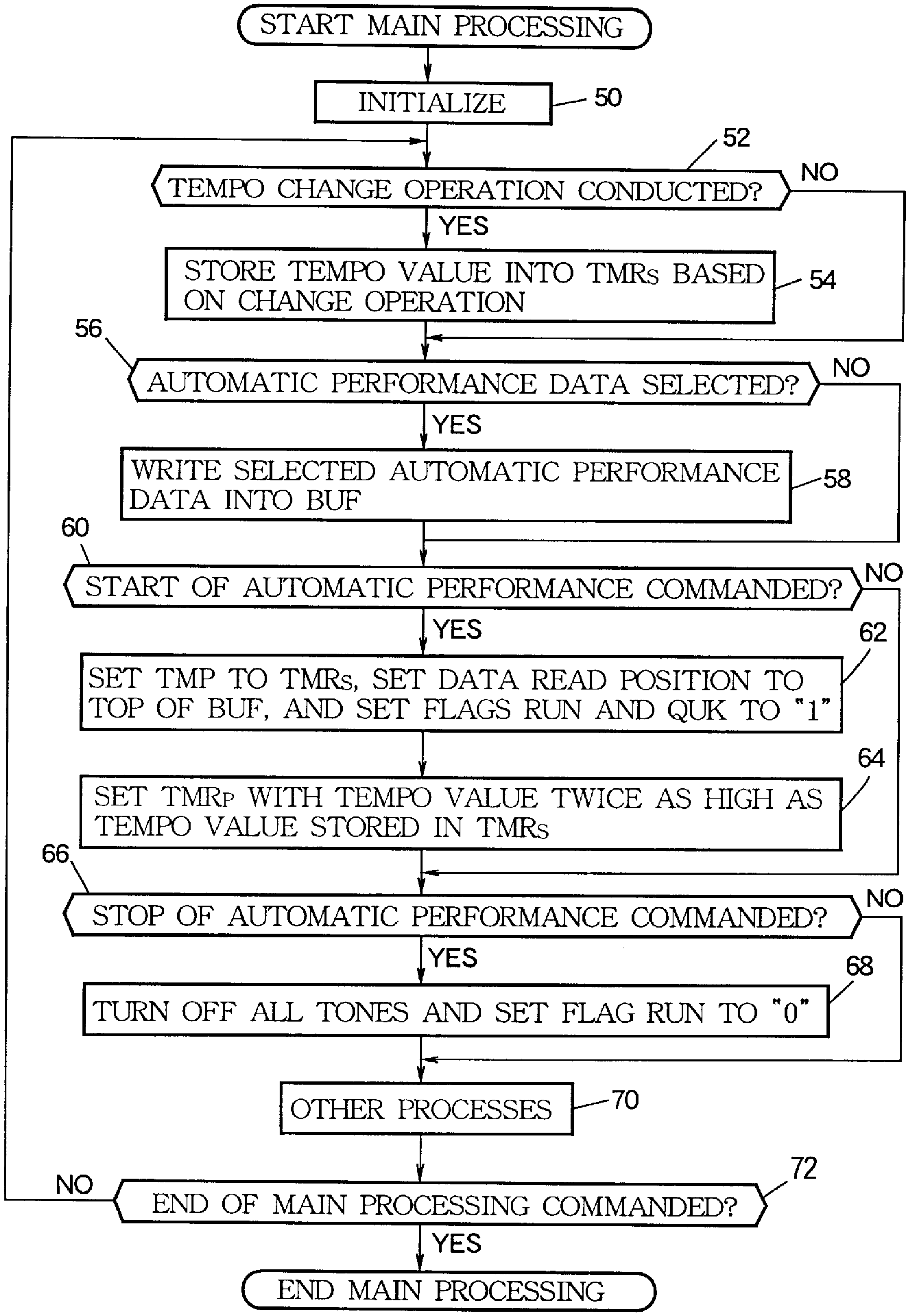
FIG. 3 is a flowchart indicative of main processing.

FIG. 3 shows the flow of the main processing, which starts when the electronic musical apparatus is powered on. In step 50, the CPU 12 executes initialization process. For example, the registers TMRs and TMRP are set to default tempo values, respectively. At the same time, the flags RUN and QUK are both set to "0". The frequency of the tempo clock signal TCL in the timer 30 is determined according to the tempo value set to the register TMRP. As the tempo value of the register TMRP increases, the frequency of the tempo clock signal TCL rises, thereby increasing the iterative speed of the interrupt process shown in FIG. 4.

In step 52, the CPU 12 determines whether tempo change operation by the tempo setting control or else has been performed on the operation control array 36. If the decision is yes (YES), then, in step 54, the tempo value based on the change operation is stored in the register $TMR_S$.

If the decision of step 52 is no (NO), then, in step 56 the CPU 12 determines whether operation for selecting automatic performance data has been performed on the operation control array 36. On the operation control array 36, the user can select the automatic performance data for a desired music piece by operating the music selection control in a state where the automatic performance data of plural music pieces stored in the ROM 14 are displayed on the display 38. If the decision is yes in step 56, then, in step 58, the selected automatic performance data are laded from the ROM 14 into the read buffer BUF.

If the decision is no in step 56 or the process of step 58 has completed, then, in step 60, the CPU 12 determines whether operation for starting automatic performance has been performed on the operation control array 36 by the start/stop switch or else. If the decision is yes, then, in step 62, the tempo condition setting data (TMP in the example of FIG. 2) is read out from the read buffer BUF into the register TMRS. Then, the data read position is set to the top of the read buffer BUF, and the flags RUN and QUK are both set to "1". In step 64, a value twice as high as the tempo value stored in the register TMRs is set to the register TMRP. In the example of FIG. 2, the tempo value is indicated by the tempo condition setting data TMP. As the results of the processing of steps 62 and 64, the condition setting data SD can be read at a rate twice as high as the reading rate or tempo of the music sequence data MD in the automatic performance data shown in FIG. 2 for example. The read processing is actually conducted by the interrupt processing shown in FIG. 4.

If the decision of step 60 is no, then, in step 66 the CPU 12 determines whether operation for stopping the automatic performance has been performed with the start/stop switch or else. If the decision is yes, then, in step 68, the CPU 12 controls the tone generator 24 to turn off all sounding tones and sets the flag RUN to "0", upon which the automatic performance comes to an end.

If the decision is no in step 66, then, in step 70 other processing is performed. The other processing includes editing of automatic performance data, additional storage of new automatic performance data, setting of keyboard performance conditions such as timbre and effect.

Then, in step 72, the CPU 12 determines whether the operation for ending the main processing has been performed by turning-off of the power switch or else. If the decision is no, then, back step 52, the CPU 12 repeats the above-mentioned processing operations. If the decision is yes, the main processing comes to an end.

Although not shown in FIG. 3, the detection of a key-on event and a key-off event on the keyboard 34 is performed to enable the generation of manual performance tones. When a key-on event is detected, the pitch information corresponding to the pressed key and a note-on command signal are supplied to the tone generator 24, upon which the tone generator 24 generates a tone signal corresponding to the pressed key. When a key-off event is detected, the pitch information corresponding to the released key and a note-off command signal are supplied to the tone generator 24, upon which the tone generator 24 starts damping the tone signal corresponding to the released key.

Figure 4:
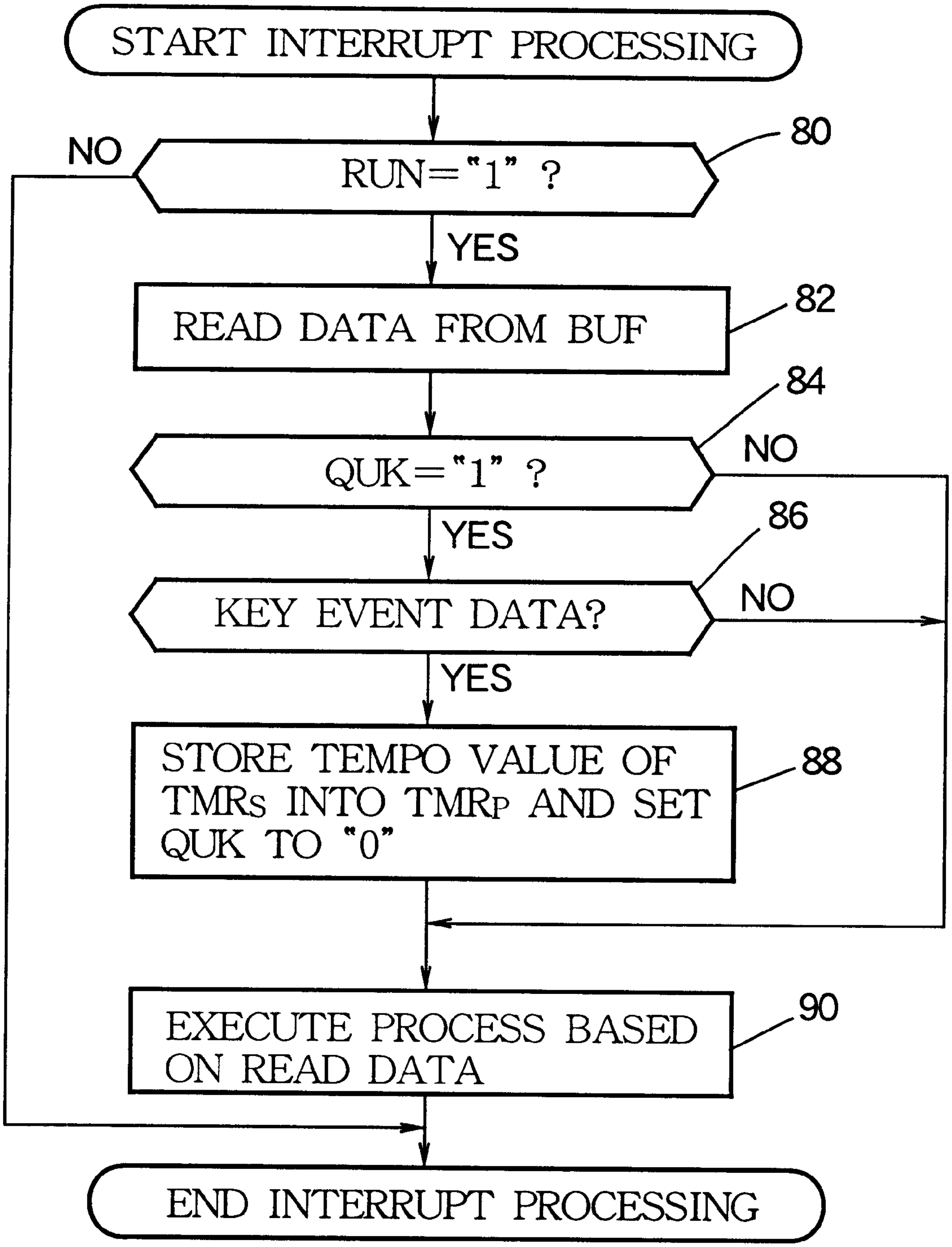
FIG. 4 is a flowchart indicative of interrupt processing.

FIG. 4 shows flow of the interrupt processing. In step 80, the CPU 12 determines whether the flag RUN is set to "1" indicating that the automatic performance is going on. If the decision is no, the following interrupt processing becomes unnecessary. Therefore, the interrupt processing comes to an end and control is returned to the main processing.

If the decision of step 80 is yes, then, in step 82, automatic performance data are read from the read buffer BUF. Assume that the automatic performance data shown in FIG. 2 is read first time in step 82 after the processing of steps 62 and 64. In this case, the value of a counter (not shown) for counting the clock pulses as the tempo clock signal TCL is compared with the value of first timing data T1. If no match is found, the timbre condition setting data TN are not yet read, upon which the interrupt processing comes to an end. If a match is found, the timbre condition setting data TN is read into the buffer register BR.

Next, in step 84, the CPU 12 determines whether the value of the flag QUK is "1" or not. If step 84 has been reached first time after the processing of steps 62 and 64, QUK should be "1", so that the decision is yes and control is passed to step 86.

In step 86, the CPU 12 determines whether the data stored in the buffer register BR is key event data or not. Because the data in the buffer register BR is timbre condition setting data TN, the decision is no and control is passed to step 90.

In step 90, the processing based on the data read into the buffer register BR is executed. If the data read into the buffer register BR is the timbre condition setting data TN, the same is supplied to the tone generator 24 for setting the timbre of the automatic performance, upon which this interrupt processing comes to an end.

A next and subsequent interrupt processing operations are executed in the same manner as described above. In a certain interrupt processing operation, if effect condition setting data EF is read into the buffer register BR in step 82, then control is passed through steps 84 and 86 to step 90. In step 90, the effect condition setting data EF is supplied to the effector 26, in which the effect to be imparted to the automatic performance tone is set.

In another interrupt processing operation, if tempo condition setting data TMP is read into the buffer register BR in step 82, control is passed through steps 84 and 86 to step 90, in which the tempo condition setting data TMP is set to the register TMRS.

In still another interrupt processing operation, if key event data K1 is read into the buffer register BR in step 82, the decision in step 86 becomes yes and control is passed to step 88. In step 88, the tempo value of the register TMRs is stored in the register TMRP and the flag QUK is set to "0". Consequently, the tempo value indicated by the tempo condition setting data TMP is set to the register TMRP and the frequency of the tempo clock signal TCL is automatically changed from the high frequency for the tempo value set in step 64 to the low frequency for the tempo value set in step 88. Namely, the subsequent reading of the music sequence data is performed at a rate comparable to a performance tempo based on the data TMP, which is lower than the tempo of reading the condition setting data SD.

Next, in step 90, the processing based on the key event data K1 is executed. If the key event data K1 is key-on event data, the pitch data in the key-on event data is supplied to the tone generator 24 together with a note-on command signal to generate a tone signal corresponding to the pitch data, upon which the interrupt processing comes to an end.

Subsequently, the interrupt processing is executed in the same manner as described above to sequentially read key event data such as K2 for carrying out the automatic music performance. If, in step 82, the key event data read into the buffer register BR is key-off event data, then, in step 90, the pitch data in the key-off event data is supplied to the tone generator 24 together with a note-off command signal, upon which the tone generator 24 starts damping the tone signal corresponding to the supplied pitch data.

During the progression of the automatic performance, if end data ED is read into the buffer register BR in step 82, the flag RUN is set to "0" in step 90, upon which the interrupt processing comes to an end. In the next interrupt processing, the decision of step 80 becomes no, and the automatic performance comes to an end.

It will be apparent that this invention is not limited to the above-mentioned examples and therefore practicable in various variations and alterations as follows.

(1) In the above-mentioned examples, the tempo of reading of the condition setting data SD is twice as high as the tempo indicated by the tempo condition setting data TMP. It will be apparent that the user may set the condition setting data SD reading tempo to any desired values in a range permitted by the system requirements or to a constant value (for example, a maximum value).

(2) The invention may be configured such that the execution of quick start is commanded by the user with a predetermined operation control in the operation control array 36. Thus, the quick start is executed only when commanded by the user. Alternatively, a command message for commanding the execution of the quick start may be inserted in advance in the automatic performance data to execute the quick start only when commanded by the command message.

(3) The invention may be configured such that the volume of the condition setting data SD is detected and the tempo at the quick start is determined according to the detected volume. This configuration raises the reading tempo as the volume of the condition setting data SD increases. Namely, the condition setting data SD reading tempo can be optimized according to the volume of the condition setting data SD.

(4) The invention may be configured such that the automatic performance data may be stored in a plurality of parallel tracks rather than a serial track, the condition setting data SD being stored in a first track and the music sequence data MD being stored in a second track. In this case, the tempo of reading the condition setting data SD can also be made faster than the tempo of reading the music sequence data MD.

(5) The operation control array 36 may be provided with a keyboard and a pointing device like a mouse tool through which characters and numerals are inputted. Operations such as tempo setting, music selection (or automatic performance data selection), and start/stop of automatic performance are executed through these keyboard and pointing device.

(6) As described, in step 62, the tempo condition setting data TMP in the automatic performance data is read into the register $TMR_S$. This setting may be omitted. If the tempo condition setting data TMP is not set, the default tempo value associated with the initialization in step 50 or the manual set tempo value associated with step 54 is set to the register $TMR_S$. Thus, a tempo value twice as high as the default tempo value or the manual set tempo value is set to the register $TMR_P$.

Referring back to FIG. 1, the inventive automatic performance apparatus is constituted by a memory section, a performance section, a control section, a command section and a detecting section. The memory section is composed of RAM 16 that stores music sequence data used for carrying out an automatic performance of a music piece, and condition setting data used for setting a condition of the automatic performance. The performance section includes the CPU 12 and the tone generator 24 for reading out the condition setting data from the memory section to set the condition of the automatic performance, and for reading out the music sequence data from the memory section to carry out the automatic performance under the set condition. The control section is composed of the CPU 12 that controls a first rate of reading of the condition setting data faster than a second rate of reading of the music sequence data, thereby accelerating the setting of the condition prior to the automatic performance. The command section is composed of the control array 36 that can be operated for inputting an acceleration command effective to enable the control section to control the first rate faster than the second rate. The detecting section is composed of the CPU 12 that detects a volume of the condition setting data so that the control section determines the first rate according to the detected volume of the condition setting data. Preferably, the control section operates when the setting of the condition is completed for changing the first rate to the second rate in conformity with a predetermined tempo of the automatic performance.

Further, the medium M is used in the automatic performance apparatus having the CPU 12 and the RAM 16. The medium M contains program instructions executable by the CPU 12 for causing the automatic performance apparatus to perform a process by the steps of loading the RAM 16 with music sequence data readably for carrying out an automatic performance of a music piece, and condition setting data readably for setting a condition of the automatic performance, reading out the condition setting data from the RAM 16 to set the condition of the automatic performance, reading out the music sequence data from the RAM 16 to carry out the automatic performance under the set condition, and controlling a rate of reading of the condition setting data faster than another rate of reading of the music sequence data, thereby accelerating the setting of the condition prior to the automatic performance.

As described and according to the invention, the first tempo of reading the condition setting data is made faster than the second tempo of reading the music sequence data to shorten the time required for setting the performance conditions. This novel constitution shortens the initial silent time before the start of the note-on sequence of the music piece, thereby allowing users to get to the start of automatic performance significantly faster than with the conventional arrangements.

While the preferred embodiments of the present invention have been described using specific terms, such description is for illustrative purposes only, and it is to be understood that changes and variations may be made without departing from the spirit or scope of the appended claims.

What is claimed is:

1. An automatic performance apparatus comprising:

a memory section that stores music sequence data used for carrying out an automatic performance of a music piece, and condition setting data used for setting a condition of the automatic performance;

a performance section that reads out the condition setting data from the memory section to set the condition of the automatic performance, and that reads out the music sequence data from the memory section to carry out the automatic performance under the set condition; and a control section that controls a first rate of reading of the condition setting data faster than a second rate of reading of the music sequence data, thereby accelerating the setting of the condition prior to the automatic performance.

2. The automatic performance apparatus according to claim 1, further comprising a command section that can be operated for inputting an acceleration command effective to enable the control section to control the first rate faster than the second rate.

3. The automatic performance apparatus according to claim 1, further comprising a detecting section that detects a volume of the condition setting data so that the control section determines the first rate according to the detected volume of the condition setting data.

4. The automatic performance apparatus according to claim 1, wherein the control section operates when the setting of the condition is completed for changing the first rate to the second rate in conformity with a predetermined tempo of the automatic performance.

5. An automatic performance method comprising the steps of:

loading a memory with music sequence data readable for carrying out an automatic performance of a music piece, and condition setting data readable for setting a condition of the automatic performance;

reading out the condition setting data from the memory to set the condition of the automatic performance;

reading out the music sequence data from the memory to carry out the automatic performance under the set condition; and controlling a rate of reading of the condition setting data faster than another rate of reading of the music sequence data, thereby accelerating the setting of the condition prior to the automatic performance.

6. A medium for use in an automatic performance apparatus having a processor and a memory, the medium containing program instructions executable by the processor for causing the automatic performance apparatus to perform a process comprising the steps of:

loading the memory with music sequence data which is readable for carrying out an automatic performance of a music piece, and condition setting data which is readable for setting a condition of the automatic performance;

reading out the condition setting data from the memory to set the condition of the automatic performance;

reading out the music sequence data from the memory to carry out the automatic performance under the set condition; and controlling a rate of reading of the condition setting data faster than another rate of reading of the music sequence data, thereby accelerating the setting of the condition prior to the automatic performance.

* * * * *